US008977410B2

(12) United States Patent
Wood et al.

(10) Patent No.: US 8,977,410 B2
(45) Date of Patent: Mar. 10, 2015

(54) APPARATUS AND METHOD FOR CONTROLLING AN UNMANNED VEHICLE

(71) Applicant: Raytheon Company, Waltham, MA (US)

(72) Inventors: Joanne E. Wood, Plano, TX (US); Jamil R. Hashimi, Hermosa Beach, CA (US); Fred G. Thourot, Tucson, AZ (US); Stephen P. Johnson, Herndon, VA (US); Russell W. Goff, Thornton, CO (US); Douglas Carroll, Carrollton, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/975,189

(22) Filed: Aug. 23, 2013

(65) Prior Publication Data

US 2014/0236391 A1 Aug. 21, 2014

Related U.S. Application Data

(62) Division of application No. 12/492,713, filed on Jun. 26, 2009, now Pat. No. 8,543,255.

(60) Provisional application No. 61/076,216, filed on Jun. 27, 2008.

(51) Int. Cl.
*G05D 1/00* (2006.01)

(52) U.S. Cl.
CPC ............ *G05D 1/0011* (2013.01); *G05D 1/0027* (2013.01); *G05D 1/0044* (2013.01); *G05D 1/0088* (2013.01)
USPC ..... 701/2; 701/11; 701/13; 701/24; 701/32.3; 244/75.1

(58) Field of Classification Search
CPC . G05D 1/0027; G05D 1/0044; G05D 1/0088; G05D 1/011
USPC ............ 701/2, 11, 13, 24, 32.3, 36; 244/75.1
See application file for complete search history.

(56) References Cited

U.S. PATENT DOCUMENTS 5,367,456 A * 11/1994 Summerville et al. .......... 701/24
6,122,572 A    9/2000 Yavnai
7,068,210 B1   6/2006 Mitra et al.
(Continued)

OTHER PUBLICATIONS

International Search Report and Written Opinion dated May 30, 2011 of PCT/US2009/048832 filed Dec. 26, 2009 (19 pages).

*Primary Examiner* — Gertrude Arthur Jeanglaude
(74) *Attorney, Agent, or Firm* — Christie, Parker & Hale, LLP

(57) ABSTRACT

In one or more embodiments, an apparatus and method for operating an unmanned and autonomous vehicle includes a sensor management module configured to direct sensors as to what function they are to provide; a mission management module configured to provide execute function capabilities; an effects management module configured to provide launching and directing weapons to their target capabilities; a vehicle management module; a situation awareness management module configured to provide correlate sensor data of objects, threats, targets, geographic points of interest that the pilot requires in the immediate environment; a communications management module; an information management module configured to provide a database of intelligence-related data; a middleware module configured to interface with the sensor management module, the mission management module, the effects management module, the vehicle management module, the situation awareness management module, the communications management module, and the information management module.

6 Claims, 5 Drawing Sheets

(56) References Cited

U.S. PATENT DOCUMENTS

| | | |
|---|---|---|
| 8,073,564 B2 | 12/2011 | Bruemmer et al. |
| 8,082,074 B2 * | 12/2011 | Duggan et al. ................ 701/24 |
| 8,108,092 B2 | 1/2012 | Phillips et al. |
| 2004/0030448 A1 | 2/2004 | Solomon |
| 2004/0030451 A1 | 2/2004 | Solomon |
| 2005/0183569 A1 | 8/2005 | Solomon |
| 2009/0079839 A1 | 3/2009 | Fischer et al. |
| 2010/0163621 A1 | 7/2010 | Ben-Asher et al. |

* cited by examiner

APPARATUS AND METHOD FOR CONTROLLING AN UNMANNED VEHICLE

CROSS-REFERENCE TO RELATED APPLICATIONS

This application is a divisional of U.S. application Ser. No. 12/492,713, filed Jun. 26, 2009, which claims benefit under 35 U.S.C. §119(e) from U.S. Provisional Application No. 61/076,216, filed on Jun. 27, 2008, incorporated herein by reference in its entirety.

BACKGROUND

This disclosure relates generally to the field of control systems and, more specifically, to systems and methods for controlling an unmanned vehicle.

Battlespace environments have evolved over the years and are becoming increasing complex to both manned and unmanned systems. In the immediate future, enemies may seek to deny access to force entry by using advanced integrated air defense systems (IADS) that employ mobile, long-range, surface-to-air missile systems that are networked with advanced early warning radar capability and command and control (C2). Such airborne intercept capability will include advanced radars, infrared-search-and-track sensors, and advanced air-to-air missiles. In their most robust form, these IADS will consist of sensors with overlapping coverage, cross-cue capability, and fiber-based networks to enable near radio frequency (RF)-silent operation. Future enemies may also seek to develop technology and tactics to negate stealth technology.

Traditional Unmanned Aircraft Systems (UAS) are remotely piloted or execute a preplanned route plan. They have limited capability to respond to a dynamic battlespace environment without direct human intervention to replan and transmit new instructions to the UAS. Traditional UAS also have limited capability to collaborate with other maimed or unmanned aircraft without human intervention. These limitations make it difficult to deploy large numbers of UAS to support a tactical mission without a large and expensive commitment of human resources to monitor and control each aircraft. In addition, continuous communications between the human operators and the air vehicles are required to respond dynamically to the changing battlespace. The continuous communication and delays in human responses may affect survivability in a hostile environment.

Based on this, manned vehicles, as well as unmanned vehicles, face a growing risk when operating at or near battlespace environments. What is needed is an architecture that addresses the problems of persistent operation in a denied battlespace.

SUMMARY

In accordance with various embodiments of this disclosure, an apparatus for operating an unmanned and autonomous vehicle is disclosed. The apparatus comprises a sensor management module configured to direct sensors as to what function they are to provide; a mission management module configured to provide execute function capabilities; an effects management module configured to provide launching and directing weapons to their target capabilities; a vehicle management module; a situation awareness management module configured to provide correlate sensor data of objects, threats, targets, geographic points of interest that the pilot requires in the immediate environment; a communications management module; an information management module configured to provide a database of intelligence-related data; a middleware module configured to interface with the sensor management module, the mission management module, the effects management module, the vehicle management module, the situation awareness management module, the communications management module, and the information management module.

In accordance with various embodiments of this disclosure, a system is disclosed that comprises a command element configured to receive and collect information from an information source and to transmit commands based, in part, on the collected information, to a subordinate element, wherein the subordinate element including one or more unmanned and autonomous vehicles that are configured to perform functions including intelligence gathering and tactical operations.

In accordance with various embodiments of this disclosure, an apparatus is disclosed that comprises an unmanned and autonomous vehicle configured to perform functions including intelligence gathering and tactical operations, wherein the intelligence gathering includes one or more of intelligence, surveillance and reconnaissance operations and the tactical operations includes one or more of planning, delivery and effectiveness assessment of weapons delivery to a target, wherein the vehicle is configured to receive commands from a command element, and based, in part, on the received commands, adapt, re-task and re-plan a pre-planned mission plan based on commands transmitted by the command element.

In accordance with various embodiments of this disclosure, a method is disclosed that comprises providing a pre-planned mission plan to an unmanned and autonomous vehicle; receiving information from a command element, wherein the information includes updated battlefield assessment, updated weather information, updated friendly operations, updated threat information; updating the pre-planned mission plan based on information received from a command element; transmitting the updated mission plan to subordinate vehicles; and performing operations on a target based on the updated mission plan, wherein the operations include one or more of the following: intelligence, surveillance reconnaissance operations, planning, delivery and effectiveness assessment of a weapons delivery to a target.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
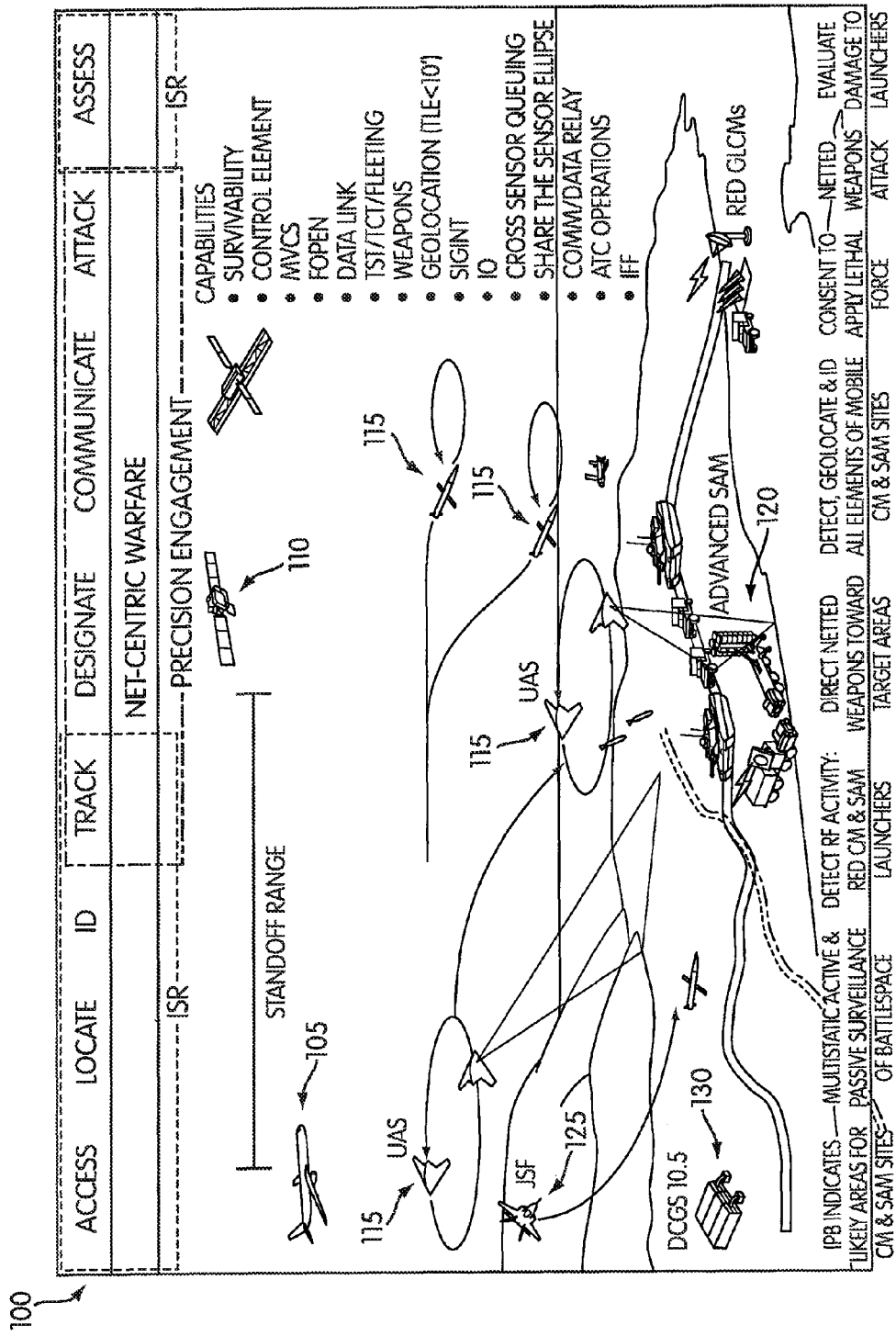
FIG. 1 shows a high level system view of a use scenario of a unmanned vehicle in accordance with an aspect of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In the description that follows, the unmanned and autonomous vehicle will be described, merely for the convenience to the reader and to simplify the descriptions, as an aircraft or UAV (Unmanned Aerial Vehicle). However, the unmanned and autonomous vehicle could be a land-based, water-based, or air-based. Moreover, the unmanned and autonomous vehicle could operate in a group of vehicles. In this aspect, the group of vehicles may include one or more vehicles from each class of vehicle including one or more of land-based, one or more of water-based, and/or one or more of air-based vehicles.

The unmanned and autonomous vehicles are configured to develop their own mission plan and to execute high level tasks assigned by human operators. This ability gives the vehicles the capability to respond to a dynamic environment without direct human interaction, as well as, gives the vehicles the ability to plan and control their own communications and adapt communications as required to satisfy mission requirements. The vehicles are further configured to collaborate amongst themselves and are able to perform missions that a single vehicle could not perform quickly or effectively. This collaboration is performed by a cross platform communications planning and management ability between members of a group of vehicles.

Aspects of the disclosure address the problems of persistent operation in denied airspace by using a highly distributed systems-of-systems approach to give individual system elements a high degree of autonomy and enabling them to respond dynamically to a changing battlespace environment. Aspects of the disclosure combine the disciplines of Intelligence, Surveillance and Reconnaissance (ISR) and Operations into a comprehensive end-to-end systems approach. It keeps a human in the loop while minimizing communication and command and control (C2) task loads on the operators. It gives highly autonomous system element situational awareness and the ability to rapidly act to avoid threats and optimally perform their mission tasks. It also gives the system elements the capability to collaborate with each other to accomplish complex missions and achieve persistent effects.

FIG. 1 shows a high level system view of a use scenario of a unmanned vehicle in accordance with an aspect of the present disclosure. Conventionally ISR and Precision Engagement are grouped as separate systems. An aspect of the present disclosure integrates an Unmanned Aerial Systems (UAS) Battlespace, which requires close integration of ISR, C2 (command and control) and Precision Engagement into a seamless System-of-Systems to close the loop on the kill chain and successfully address time-sensitive and time-critical missions. An aspect of the present disclosure employs a Service Oriented Architecture (SOA) to integrate loosely-coupled system elements and provide a high degree of autonomy.

The battlespace is shown generally at 100. Deep ISR vehicle 105 is shown at standoff range, which is outside of the range of ground-to-air defense assets 120, such as advanced surface-to-air missiles (SAM). Unmanned aerial systems (UAS) 115 are shown operating within battlespace 100. Distributed Common Ground System (DCGS) is shown at 130 and is discussed below. Deep ISR vehicle 105 and/or UAS 115 are configured to communicate with Precision Engagement Assets 110 and/or Joint-Strike Fighter 125 to strike targets in battlespace 100.

In FIG. 1, UAS 115 are shown having two vehicles per group. However, each UAS may include a single vehicle or more than two vehicles. By way of a non-limiting example, the UAS operate in flights of two or more unmanned aircraft that include one or more designated flight 'leader' and the remainder designated as 'followers.' The UAS operate using 'cascading optimization,' wherein the planning and execution of tasks are distributed within each element of the system, i.e., AMCE (Advanced Mission Control Element which is described below), leader, or followers. Each element of the system receives a set of abstract data describing a task for it to perform from its commanding element. For example, the commanding element may be located in an airborne system including the UAV, deep ISR vehicle 105 or in a land-based or sea-based system such as in DCGS 130. The commanded element only performs the planning needed to perform its assigned tasks and to command lower level elements. In 'cascading optimization,' those lower elements in turn only performs the planning needed to perform their assigned tasks and to command the next lower element. This approach not only conserves bandwidth by having local computations, but also enables more dynamic operations since each successive level may re-plan its task to incorporate any updated information it has received from local or other sources.

As described above, the commanding element may be deploy, in a single- and multi-ship configurations, with other airborne Global Strike platforms such as F-22, F-35 and B-2. The commanding element may be operate in ground, sea, or air environment that may be forward deployed in theater or operated from rear areas. Threat situational awareness (SA) and targeting data is shared among Global Strike assets via a line-of-sight (LOS), both narrowband and wide band, airborne data link network (Global Strike Network). This tactical-edge data is then shared via beyond-line-of-sight (BLOS), both narrowband and wide band, data links for further fusion and collaboration with reach-back intelligence sources, and those results are returned BLOS to tactical-edge assets. Examples of BLOS include Ku-band satellite communications (SATCOM) links. Additional communication mechanism can be used. For example, airborne networking can be used to establish a network between UAS elements and to external nodes. This network can be used to exchange mission data, health and status information and to maintain a consistent situation awareness across the UAS. An airborne networking relay beyond line-of-sight can be use to relay critical data between elements external to the UAS. The elements of the UAS may have the ability to do a network broadcast transmission (multicast push) of mission critical communications among the nodes comprising the UAS. Furthermore, the elements of the UAS may be able to communication with other elements of the UAS and/or with external elements by use of covert communication, such as communications having a low-probability of interception (LPI) and/or low-probability of detection (LPD). These reach-back intelligence sources include products and reporting that are available from the DCGS. In its ultimate form, reach-back intelligence provides tasking ability, in tactically responsive timelines, to national-level assets for products and reports not available via the DCGS. This added level of collaboration will increase threat SA to improve the survivability of the Global Strike force, and will further refine the target geolocation and identification to improve the timeliness and accuracy of targeting.

A net-enable surveillance and battle management command and control (BMC2) functionality may be ground-based or reside on a standoff airborne platform, outside the reach of long-range anti-access systems. In either case, the C2ISR includes the BLOS networks and the collaboration and fusion of non-traditional ISR (NT-ISR) data from penetrating Global Strike platforms with data obtained from national-level, overhear assets.

This integration and autonomy provide human operators with full battlespace awareness and allows them to direct flights of UAS aircraft with reduced human-task loading. The operators focus on the overall mission while the automated systems plan and execute tasks based on the operators' high level of direction. This also allows the UAV aircrafts to work in close collaboration to perform missions that could not be performed effectively by a single aircraft.

Figure 2:
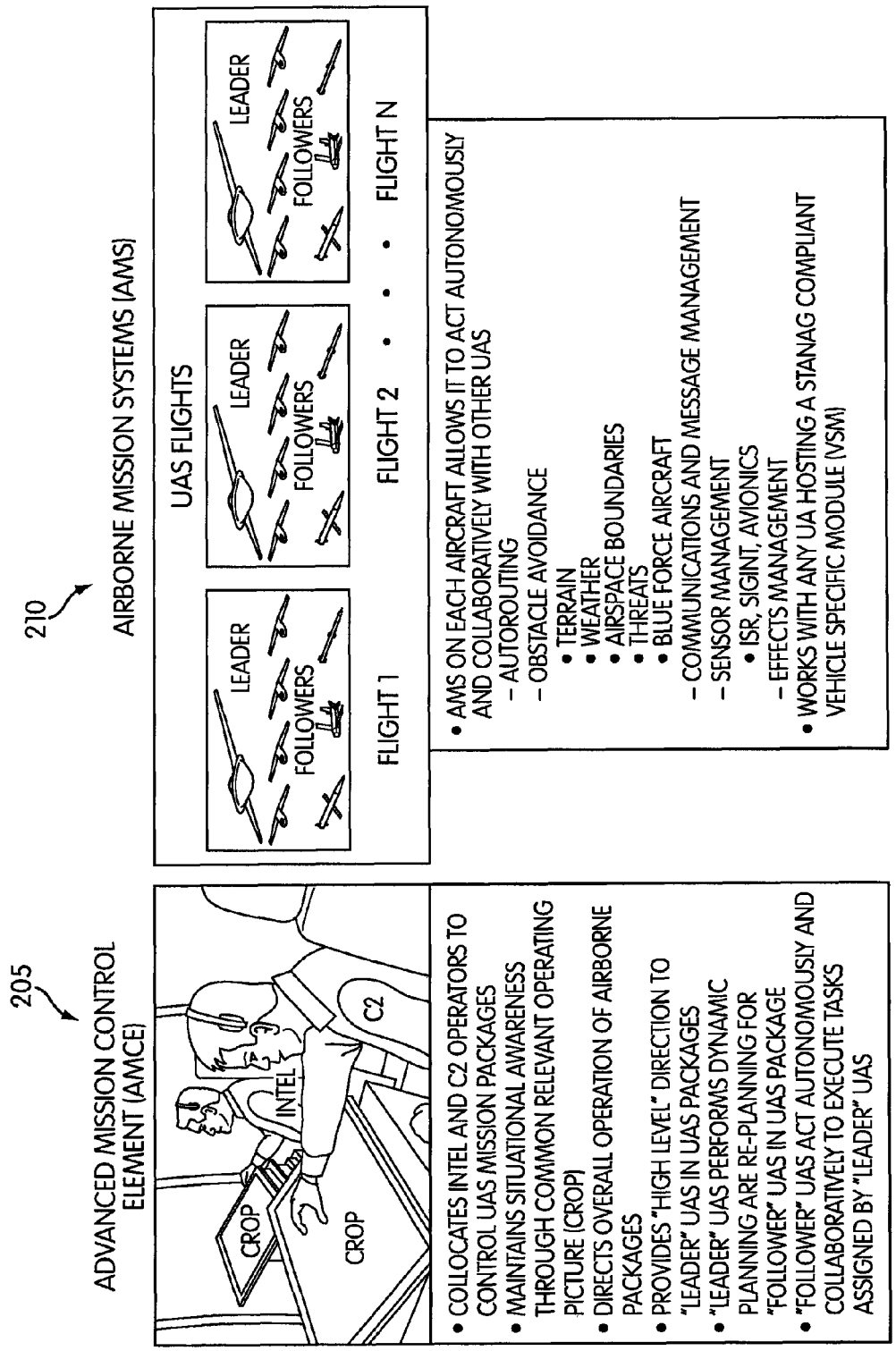
FIG. 2 shows a functional view of an Advanced Mission Control Element (AMCE) in accordance with an aspect of the present disclosure.
Figure 3:
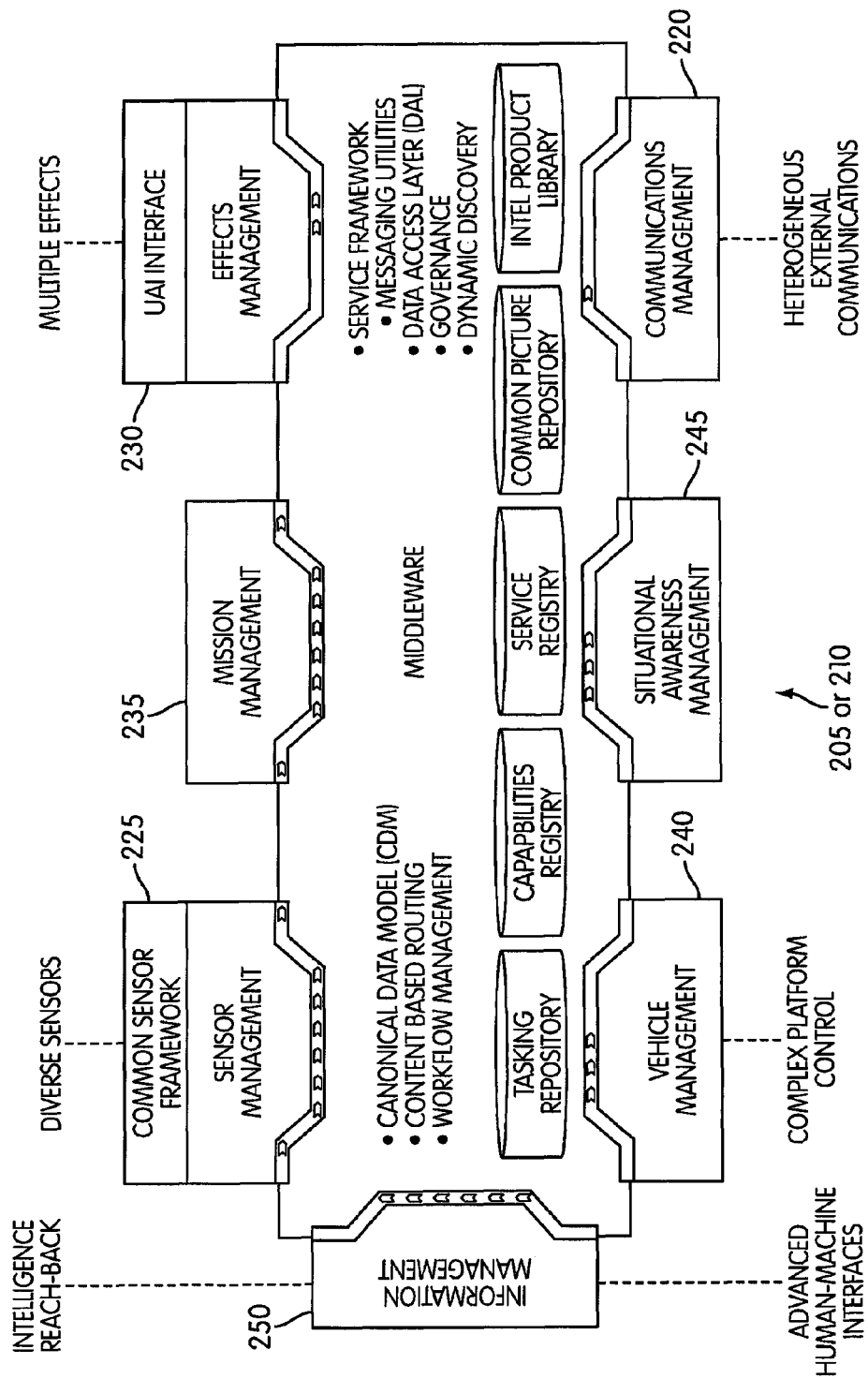
FIG. 3 shows a component view of the Advanced Mission Control Element (AMCE) and AMS (or AMCE-A) in accordance with an aspect of the present disclosure.

FIG. 2 shows a function view of an Advanced Mission Control Element (AMCE) and FIG. 3 shows a component view thereof in accordance with an aspect of the present disclosure. AMCE 205 is configured to function as an element that is configured to closely coupling C2 and intelligence to maintain battle space awareness. The AMCE is also configured to direct the flight operations using automated tools to minimize the number of operators required. On board each UAS aircraft is an Airborne version of the Advanced Mission Control Element called an AMCE-A (also called AMS) 210. AMCE-A 210 includes a Tactical Service Bus and associated mission services. The AMCE-A provides autonomous capability for operations of the vehicle and on-board systems.

The Advanced Mission Control Element (AMCE) 205 (and 210) is a collection of functional elements embodied within a Service Oriented Architecture (SOA) that enables effective and integrated mission execution, yet are separate from the flight- and safety-critical components of the UAV's airborne platform. Functional elements such as Communications Management (CM) 220, Sensor Management (SM) 225, and Effects Management (EM) 230 individually perform the capabilities that the UAV needs. A SOA infrastructure hosts these functional elements as pluggable (separate) services that are accessed via standardized (open) interfaces. By introducing the Mission Management (MM) service 235, these mission-critical services work collaboratively to fulfill the mission with a level of efficiency, effectiveness and automation not seen in current warfighting systems.

Tasking or commands enter the mission system from off-board, from the operator or from another service within the mission system itself. This information is automatically routed to the MM domain by message-content-based routing capabilities of the SOA infrastructure. MM acts as a resource management broker with a global view of the entire mission and capabilities of the supporting services and platform. It orchestrates using the supporting mission services (MS), and relies on each service to perform its designed capability. MM also resolves any conflict for resources that may arise between the services. It resolves resource conflicts by using dynamic capabilities modeling, resource allocation algorithms, and configurable, rule-based processing. The SOA infrastructure and managed service orchestration are the foundation of enabling a high degree of automation and autonomy of the platform.

Mission Management (MM) 235 is configured to automate the system planning and execution functions on board the platform so that human pilots and operators are not required to manually control individual systems. This management functionality allows pilots and operators to focus directly on warfighting to produce high-quality situational awareness (SA) and precision effects.

Sensor Management (SM) 225 is configured to monitor and control organic sensors, plan and manage the use of their sensing capabilities, and process and disseminate sensing products. The SM is also configured to accept mission goals, instructions and tasks from MM and then to generate and schedule the activities of organic-sensing capabilities (i.e., sensing tasks) to satisfy them.

Effects Management (EM) 230 is configured to handle all services related to the platforms effects capabilities. The EM is also configured to provide a common interface, via an Universal Armaments Interface (UAI), and a managing layer between MS and the effectors aboard the platform.

Vehicle Management (VM) 240 is configured to interface with the safety of flight and flight critical functions of the platform, provisioned by the platform provider. The VM is also configured to contain the collection of services responsible for generating waypoint routes and retrieving relevant platform information needed by the MS.

Situational Awareness Management (SA) 245 is configured to correlate all information available to the system to derive a cognitive understanding of the operational environment. It detects changes in the operational environment, such as weather, threats, system anomalies, and alerts the MM to any changes.

Information Management (IM) 250 the collection of subsystems that are configured to provide services for the creation, fusion, correlation, storage and distribution of messages, models, data and intelligence. It also provides the capability to separate information at different security classifications and enforce multi-level security policies to protect the availability, integrity and confidentiality of information. Because the IM domain contains so much functionality, a number of MS are mapped to one of its subsystems, which include, Intelligence Management, Capabilities Management, HMI Management, Message Management, Configuration Management and Resource Model Management.

Communications Management (CM) 220 is configured to enable flight and package coordination, command and control (C2) and reachback to decision makers. The networking and communications infrastructure's primary function is to manage the transfer of control and mission data within the platform and between the platform and external systems.

Communications Manager 220 is configured to take advantage of the SOA to facilitate the integration of Communication Management Services. The distributed nature of the SOA provides the capability for the Communication Manager Services to interact in a loosely coupled environment as a complete SoS. The purpose of the Communications Manager is to provide the UAS with robust, multi-mission, adaptable to the threat environment, communications capability. The survivability of deep penetrating ISR and PE missions, in denied air space, is increased through the use of advanced LPI/LPD waveform techniques. The primary function of the UAV Communications Manager is to access and manage communications resources to effect the movement of critical system data items within the UAV and with external elements.

Communications Manager 220 is responsible for providing the communications infrastructure for the UAV. The infrastructure includes a complex ensemble of nodes and interconnecting paths. Nodes are the elements, both internal and external to the UAV, between which communication are to occur. Paths are initially established according to the mission plan and then dynamically modulated as required, in response to evolving mission dynamics. Each communications path has attributes of bandwidth, security and connection type (point-to-point, network or broadcast) associated with it. The Communications Manager includes a set of services that are responsible for establishing and validating the required paths.

Communication paths are established between nodes based on the following set of criteria: available resources, compatible security levels, required bandwidth, verification that line-of-sight or beyond line-of-sight communications can be established, considering LPI and LPD, given the relative geometries of each node, when multiple solutions exist for establishing a required path, a best route algorithm is used to establish the path, compatible waveform types, contingency management in response to changing mission requirements or loss of a resource, and network service.

Communication Manager 220 has a numerous services that are responsible for managing the infrastructure. The services include Security Manager, Network Manager, Key Manager, Resource Manager, Communications Planning Manager, Contingency Manager, Platform Assessment Manger and Link Manager.

Security Manager coordinates with the Key Manager and configured to manage multi-layer security aspects of the UAV, as well as, with elements outside the UAV. This ensures that the data is properly portioned based on classification and that communication paths are compatible from a security perspective. The Security Manager is also configured to verify data that is requested by or supplied to the UAV from outside system elements.

Network Manager is responsible for managing the network infrastructure. The Network manager is configured to work with the other communication services to host a network. The required network connectivity is established as part of the initial communications plan for each mission. Moreover, there is also an ad hoc component to the network composition. As resources are lost or possibly additional resources are acquired by the UAS, the Network Manager facilitates the actions required to provide the needed changes to the network to support changes in resource composition. The Network Manager coordinates with the Security Manager and the Key Manager to ensure that all data and other communications occur at the proper security level. Security keys, i.e., cryptographic keys, are issued to the UAV resources according to a prescribed security plan. Working with the Resource Manager, the Network Manager will establish network connections between participating entities according to a common set of networking capabilities indigenous to each element. Working with the Resource Manager, the Network Manager will issue and track network addresses and other relevant networking information.

Communication Manager 220 also includes Key Manager which works closely with the other communications services to manage cryptographic keys, including asymmetric public and private keys and/or symmetric private keys that can be used for various cryptographic applications including data security, integrity and authentication protocols. The cryptographic keys enable compartmental data to be isolated and, thus assist in denying data and network access to unauthorized users. In addition to cryptographic keys, further security robustness is achieved by employing digital certificates to validate network transactions. The Key Manager is also configured to issue cryptographic keys and digital certificates according to a prescribed security policy.

Another service of Communication Manager 220 includes Resource Manager that is configured to be cognizant of all available communication resources, including resources lost and acquired during a mission. Additionally, it is configured to maintain the health status and capabilities of each resource. For example, at a start of a mission, the Resource Manager builds a list, in real time, of all available UAS resources. The Resource Manager tasks the available resources according to the requirements of the mission plan provided by the Communications Manager. As mission dynamics change, the available resources or requirements for resources may also change. During these periods of change, the Resource Manager works with the Contingency Manager to best allocate available resources to meet changing mission requirements.

Another service of Communication Manager 220 includes Communications Planning Manager that is responsible for establishing and/or identifying communications infrastructure or communication needs to support the planned mission. This service is responsible for defining the method for secure transmission of data between nodes (LPI, LPD, etc.). The Communications Planning Manager tasks the Resource Manager with the requirements for communications to meet the critical mission communication needs. Planning considerations include: establishing the appropriate communications paths, both internal and external; and identifying the mission communications requirements and tracking the requirements engendered by a changing mission plan. For example, deep penetrating missions often need to include stealth technology for the UAS. By using LPI/LPD strategies, the UAS can evade detection. The Communications Planning Manager is responsible for implementing the LPI/LPD mission strategies.

Another service of Communications Manager 220 includes Contingency Manager that is responsible for dynamically replanning the communications infrastructure according to changes in the mission communications plan and evolving battle space conditions and threat environment. As resources are gained or lost by the UAS or mission requirements change, the Contingency Manager is responsible for modifying the initial communications plan to support the evolution of communications requirements. The Contingency Manager works with the Communications Planning Manager and the Resource Manager to establish and meet the contingency mission plans.

Platform Assessment Manager is configured to provide Resource Manager and Contingency Manager with the health and status of the communications components on each UAS asset. The Resource Manager and the Contingency Manager use this information to maintain the planned communications requirements and in the allocation of additional resources when modifying the communications plan.

Link Manager is configured to provide Resource Manager and Contingency Manager with quality-of-service (QoS) metrics for each of the communication links. These metrics are used by the Resource Manager and Contingency Manager to maintain the communications plan. For example, if a particular link's quality begins to degrade, the Link Manager provides the necessary metrics to the Resource and Contingency Managers to use other available resources to reestablish the failing link. In some cases, a link may begin to fail because the relative node geometries result in poor link performance. In this case, either the link is dissolved or an alternative mechanism for routing is found.

Communications Management Service is configured to provide safe and secure movement of data and commands between nodes of the system. The various nodes include the Advanced Mission Control Element (AMCE) and an Advance Mission Control Element—Airborne (also called AMS), which may be a component of each platform including: Very High Altitude Intelligence, Surveillance and Reconnaissance Element (VHAISR), Deep Intelligence, Surveillance and Reconnaissance Element (DISR), Deep Precision Engagement (DPE), Marsupials, satellites, unmanned and manned aircraft, Launch Recovery Element (LRE), Distributed Common Ground System (DCGS) and Ground/Maritime Forces (Special Ops).

This service capability is provided by assigning communication tasking priorities, selecting communication methods that enable secure data and command transmission, implementing flexible infrastructure for connecting networks and providing distributed communication planning capabilities across the UAS.

A mission plan is created for the UAS by scheduling the resources of each node to optimally collect or provide a function that satisfies a mission need. Priorities are assigned to the mission tasks that are created to define these resources and time of execution assignments. In a like manner, communication tasks are also assigned priorities. These communication tasks may be coupled with the mission tasks, to assure the data or command needs of the mission task are satisfied in a timely manner. During the mission planning phase, initial assignment of mission tasks and communication tasks are accomplished for each UAS node. During mission execution changes to the initial plan may be needed. It is during this ad hoc replanning that priorities of the new mission tasking may consider the priorities of current mission tasks and current communications tasks, to assure the new mission tasks are supported.

The communication tasks that are chosen to execute the mission, may consider the battlespace environment. Data or commands information that pass between nodes, do so with minimal likelihood of that data being compromised. The Communication service provides services such as Low Probability of Intercept (LPI) and Low Probability of Detection (LPD) capability to securely move data and commands between UAS nodes. LPD will minimize the ability of an outsider to determine that a signal has been transmitted. LPI will minimize the ability of an outsider to determine that a signal exists and extract intelligence from that signal.

A service-oriented architecture is essentially a loosely coupled set of non-hierarchical software modules. Each module contains a large chunk of functionality, known as a service. These services can be strung together to form an ad-hoc mission application. This service-based structure is enabled by abstracting the module interfaces and providing a central data model that describes both the characteristics of the service and the data that drives them.

Some of the benefits of this approach are that it enables the use of diverse module providers (i.e., COTS products), it allows for the addition, replacement or upgrade of services with minimal impact to the other system elements and makes the system elements (i.e., the air vehicle) largely configuration independent. Operationally, the SOA facilitates a rapid change out of system elements, services and components thereby allowing for dynamic reconfiguration in system capabilities.

Service Oriented Architecture (SOA) offers significant advantage in development of complex systems. It provides an overarching strategy for building software that abstracts the systems interfaces to allow dissimilar system elements and services to interact together to form large and complex systems. It allows the addition or replacement of services with minimal impact to the other system elements. It also makes the system air vehicle independent and permits rapid change-out of system services and components (i.e., software, sensors, effectors and processors).

In some aspects, security for systems using SOA near the tactical edge may be implemented at a single security level. In some aspects, utilizing security kernels in the design may afford the opportunity for interface with security enclaves that operate at different security levels. By way of a non-limiting example, a secret-high SOA on a tactical UAS may contain a secret-level sensor manager that interfaces with atop secret-level sensor. The interface between the sensor manager and the sensor may be controlled so that only information that meets specific security policy guidelines is passed along the interface. The policy guidelines may be approved by an accreditation authority. The device that implements the policies must be trusted and approved to precisely implement the approved policies.

Specific timing requirements will likely lead to overall system response time requirements that may require use of a real time operating system (RTOS). Moreover, the overall processing load required by the system and communications bandwidth available will determine how stringent the processing timing requirements will be. This will drive both communications and computing systems architectures and their design. In some aspects, overall processing load may require multi-core processors and possibly more than one processor. Further, information assurance requirements may impact the use of the RTOS. The RTOS must support various applications such a high bandwidth sensor inputs, processing of track data associated with Situational Awareness (SA), and communications protocols with low latency response requirements. The RTOS may integrate with middleware that can negotiate high-bandwidth, real-time applications with slower enterprise infrastructures common with SOA. In addition to performance, the RTOS also may be able to support a Cross-Domain environment with multiple independent levels of security. In terms of Information Assurance (IA), the RTOS must be able to, support a minimum Common Criteria (CC) Evaluation Assurance Level (EAL) of 6.

By way of a non-limiting example, an aircraft autopilot is a safety critical device with hard real time requirements. If the autopilot function were to implement in an SOA with a host of other services it would be very difficult to consider all possible interactions and verify that the autopilot will always perform as expected. However, implementing the autopilot separate from the SOA and interfacing it with the SOA through a vehicle management service simplifies the problem. The autopilot controls the flight services in real time while the vehicle manager plans routes of flights and way points in non-real time and passes them to the autopilot for execution.

Figure 4:
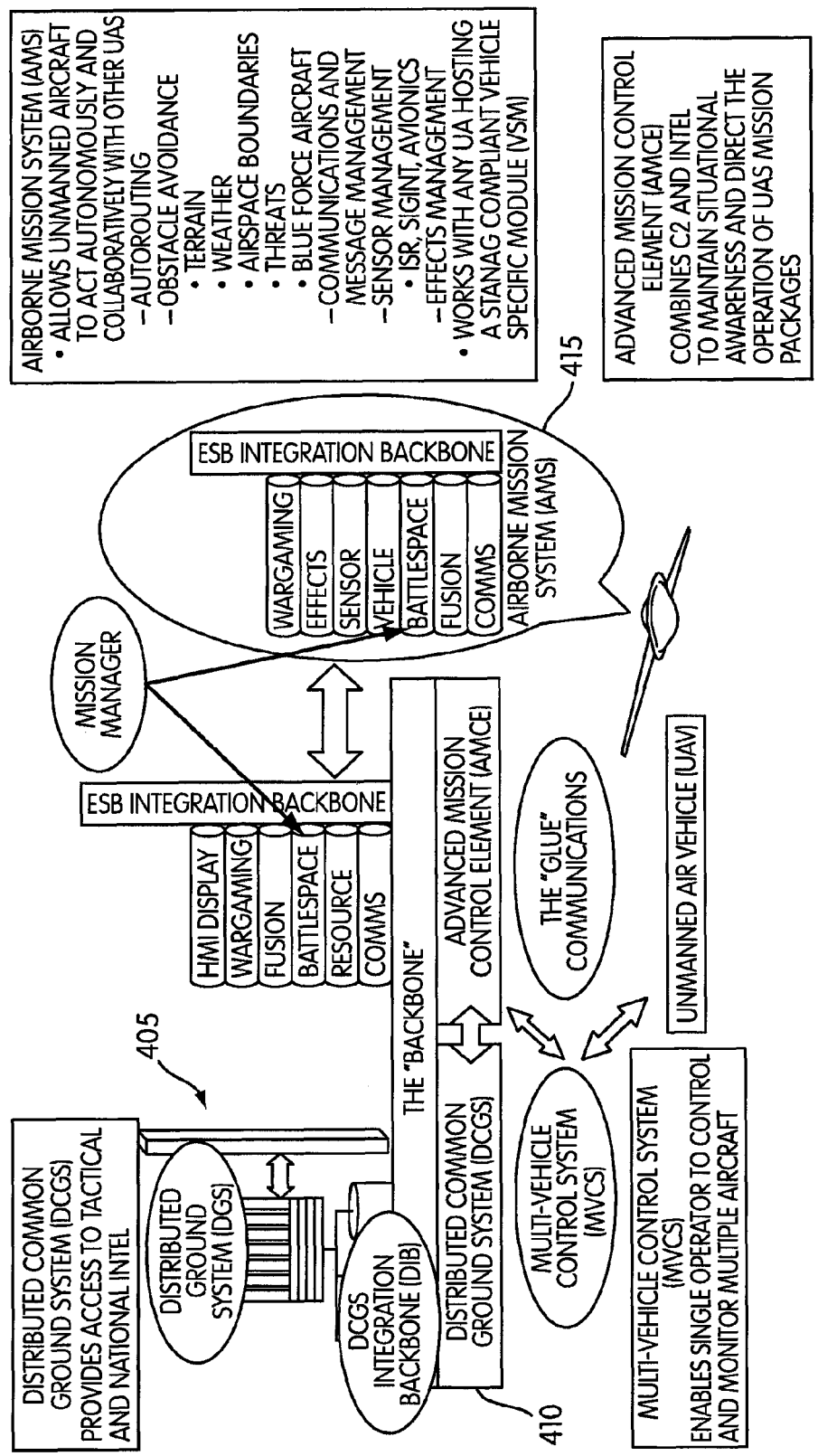
FIG. 4 shows a representation of how the system services are integrated in accordance with an aspect of the present disclosure.

FIG. 4 shows a representation of how the system services are integrated in accordance with an aspect of the present disclosure. A element of the ground system architecture is Distributed Common Ground System (DCGS) 405 which provides interfaces with ISR systems across a Global Grid. Enterprise Service Bus is extended in capability to allow a host of services to interact. The extended bus is Tactical Service Bus (TSB) 410 and the host of services include Human Machine Interfaces, War Gaming, Fusion, Battlespace management, Vehicle Management, Sensor Management and Communications management. Airborne Mission System 415 also includes these services on the aircraft to provide autonomous and collaborative UAS behavior.

By way of a non-limiting example, if it is desired to use a hyper-spectral sensor in the UAS design, the resulting hyper-spectral data cubes could be processed using a two-processor architecture. The first processor could be a low-power generic CPU that is used to process the decision logic (i.e., service management, mission assurance logic, etc.), and the second processor could be devoted to sensor data processing and fusion. Tactical Service Bus (TSB) 410 could be run under the generic processor, while a Java Virtual Machine could be loaded onto the second processor so that it could connect to the TSB.

By way of a non-limiting example, the TSB capabilities may been leveraged as an enterprise service bus infrastructure to which the AMCE-A components may be added on-board aircraft. The TSB components address services health and status, communications, message routing, on-board computer services monitoring and capabilities registry. The AMCE-A components address mission specific services, such as sensor, effects, vehicle management. The SOA concepts of ease of integration and loosely coupled components are some of the TSB benefits. The TSB infrastructure provides the core capabilities that are necessary on any platform and the AMCE-A components can be created to provide mission specific functions for that platform.

Figure 5:
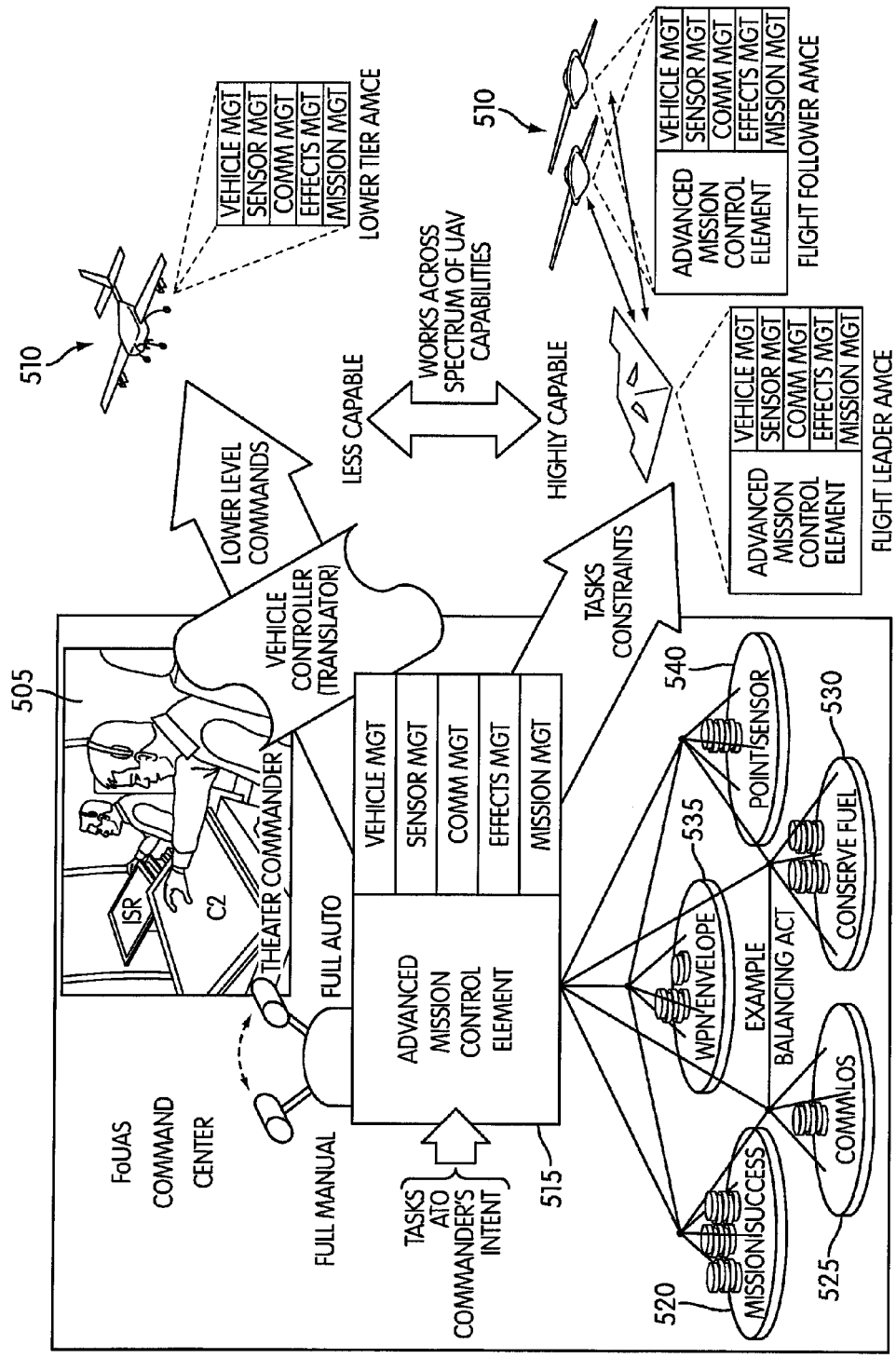
FIG. 5 shows the functionality of the Adaptive Battlespace Manager (ABM), which is a capability of the AMCE and AMS (or AMCE-A) in accordance with an aspect of the present disclosure.

FIG. 5 shows Adaptive Battlespace Manager (ABM) functionality of the AMCE and AMCE-A in accordance with an aspect of the present disclosure. Controllers 505 remote from battlespace can interact with UAS 510 via the AMCE 515. ABM process enables the air and ground systems to balance the competing factors including mission success 520, communication LOS 525, conservation of fuel 530, effective range of weapons on a target 535, sensor range 540, in a dynamic mission planning to find the optimal solutions for mission accomplishment. The ABM process obtains the information it needs to develop mission plans by interacting with other services through the SOA. The MM may include an embedded wargaming application that is configure to generate proposed mission plans. Each of the SOA domain managers (SM, EM, VM, SA, IM and CM) evaluates the merits of each proposed mission using a domain specific algorithm to determine the effectiveness of that plan from the domains perspective and assigns a numeric cost. For example, if the VM determined that a proposed mission plan would seriously jeopardize air vehicle safety it would assign an infinite cost. If the VM determined that a proposed mission plan was optimal it would assign a zero cost. If the VM determined that a proposed plan was acceptable but not optimal, it would assign a cost greater than zero but less than infinity (relative to the plan merit). Likewise, each of the other domain managers would also evaluate the proposed plans from their domain perspective and assign costs (VM: terrain avoidance, fuels management, flight safety, etc.; SA: weather, threats, etc.; CM: communications reliability, etc.; WM: weapon capability and probability of mission success; and CM: sensor capabilities and probability of mission success). The MM combines the costs assigned by each of the domain managers and rejects plans with high or infinite costs. It balances the competing factors and optimally assures mission success by selecting the plan with the lowest combined cost. At periodic intervals (or upon a trigger), the ABM dynamic planning process is repeated to respond to new direction or changes in the battle space environment. If a critical time sensitive event occurs that does not allow time for an ABM planning cycle, the ABM process would execute a preplanned tactic to provide an immediate response to allow time for a new plan to be developed. For example, if the SA detected an incoming surface-to-air missile, the ABM process would select an immediate tactic to change directions and drop a countermeasure. This ABM process accommodates a "systems of systems" modular architecture so that additional domain managers or services can be added to or removed from the system, register or de-register their capabilities with the MM, and participate in or be removed from the ABM dynamic planning process.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:

1. An apparatus comprising:
    an unmanned and autonomous vehicle configured to perform functions including intelligence gathering and tactical operations, wherein the intelligence gathering includes one or more of intelligence, surveillance and reconnaissance operations and the tactical operations include one or more of planning, delivery and effectiveness assessment of weapons delivery to a target,
    wherein the unmanned and autonomous vehicle is configured to receive commands from a command element, and based, in part, on the received commands, adapt, re-task and re-plan a pre-planned mission plan, and
    wherein the unmanned and autonomous vehicle is configured to adapt, re-task, and re-plan the functions to incorporate updated information received from local sources while being deployed as a follower vehicle.

2. The apparatus according to claim 1, wherein the unmanned and autonomous vehicle is configured to operate on either a land-based, water-based, or air-based platform remote from the command element.

3. The apparatus according to claim 1, wherein the unmanned and autonomous vehicle is configured to operate in a group of vehicles commanded by the command element, wherein a single vehicle of the group of vehicles is configured to be designated as a leader vehicle and a remainder of the group of vehicles are configured to be designated as follower vehicles.

4. The apparatus according to claim 3, wherein the leader vehicle is configured to adapt, re-task and re-plan the pre-planned mission plan based on commands transmitted by the command element.

5. The apparatus according to claim 4, wherein the leader vehicle is configured to transmit the re-tasked and re-planned mission plan to the follower vehicles in the group of vehicles.

6. The apparatus according to claim 5, wherein the leader vehicle and the follower vehicles are configured to communicate using a different communication mechanism than what was used to transmit the commands from the command element.

* * * * *